UNITED STATES PATENT OFFICE.

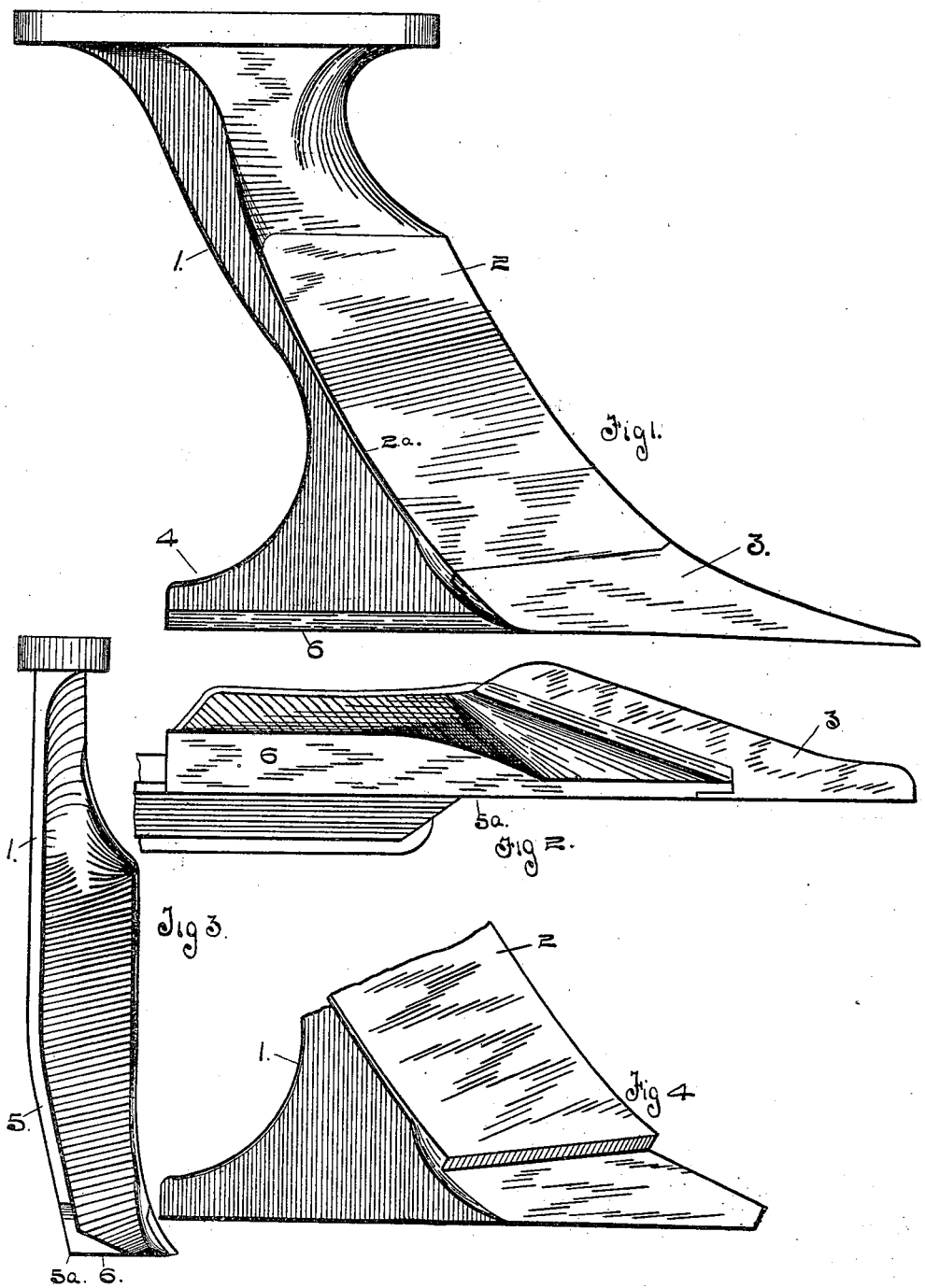

FRED M. OEDER, OF WEST BAY CITY, MICHIGAN, ASSIGNOR TO JAMES E. WRIGHT, OF SAME PLACE.

PLOW FOR HARVESTING BEETS.

SPECIFICATION forming part of Letters Patent No. 670,160, dated March 19, 1901.

Application filed April 18, 1900. Serial No. 13,349. (No model.)

*To all whom it may concern:*

Be it known that I, FRED M. OEDER, a citizen of the United States, residing at West Bay City, in the county of Bay and State of Michigan, have invented certain new and useful Improvements in Plows for Harvesting Beets, &c.; and I do hereby declare the following to be a full, clear, and exact description of the invention, such as will enable others skilled in the art to which it appertains to make and use the same.

This invention is a plow for digging sugar-beets, chicory-roots, carrots, and like vegetables and for subsoiling.

The objects are to produce a plow that will loosen the earth without forcing the vegetables out of the ground and to leave them in condition to be picked out of the loose soil by hand either immediately after the digger has loosened them or later if it is not desired to harvest them immediately.

A further object is to provide a beet-digger that will operate by pushing the soil to one side, thus loosening the beet without raising it forcibly and breaking the lower end of the root, as in diggers that operate by direct lift.

A further object is to produce a digger of the kind described that will not greatly disturb the surface of the field, but will effectually loosen the beets, while requiring a small amount of draft or force to draw it.

My invention is shown in the accompanying drawings, throughout the several views of which similar characters of reference designate corresponding parts and devices.

Figure 1 is a side elevation of the digger. Fig. 2 is a plan view of the bottom, showing the digger as it appears when viewed from below. Fig. 3 is a rear view, and Fig. 4 is a detail of the lower part of the digger with the point removed.

As is plainly shown in the drawings, the digger, which can be mounted on a beam as any plow, consists in a standard 1, forming a landside, and an upright moldboard 2, carried by the standard. The moldboard has an upward and rearward rake to its front edge and extends backward from the front edge, gradually diverging from the landside. The moldboard is of substantially uniform width throughout its height. From the lower end of the moldboard a removable point 3 projects forward, as shown in Figs. 1 and 2. The rear end of the landside 1, near its bottom, extends backward, forming a guide or bearing 4 to take the lateral thrust or reaction of the moldboard 2. The lower end of the landside is preferably made with an inward deflection 5, as shown in Fig. 3, to decrease the tendency of the edge 5$^a$ to run too deep when in difficult ground. A shoe 6 takes the downward thrust of the moldboard and prevents the rear end of the digger from running too deep.

The operation of the digger is as follows: The digger runs along the row of beets or other plants with the moldboard distant a few inches from the row. The moldboard presses the earth aside and at the same time slightly raises it. The beet slightly rises with the mass of compressed earth, but is immediately released as the rear edge of the moldboard 2$^a$ passes and allows the beet and the earth surrounding it to drop back into place. In practice the beets are seen to rise slightly as the moldboard of the digger approaches them, and as it passes they drop back into place with a rotary or whirling motion and remain embedded in loose earth, from which they are easily extracted by hand.

It is evident that since there is no furrow turned and since the weight of earth surrounding the beet is not lifted to any great extent the draft is light and the process of loosening the beets is rapid and effective. The beets are left cleaner and have less adhering dirt than when dug by the usual lifting and loosening forks.

What I claim is—

The combination in a plow for digging beets and the like, of a standard; an upwardly and rearwardly extending moldboard of substantially uniform width carried by said standard; a rearwardly and inwardly extending landside arranged to take the thrust of the moldboard, and a removable point, the surface of which corresponds to the upward and rearward sweep of the moldboard, substantially as described.

In testimony whereof I affix my signature in presence of two witnesses.

FRED M. OEDER.

Witnesses:
   GEO. B. WILLCOX,
   WM. STEPHENS.